Sept. 2, 1952      R. A. SANDBERG      2,608,881
STRAIGHT PULL BRAKE LEVER ASSEMBLY
Filed Dec. 30, 1947      2 SHEETS—SHEET 1
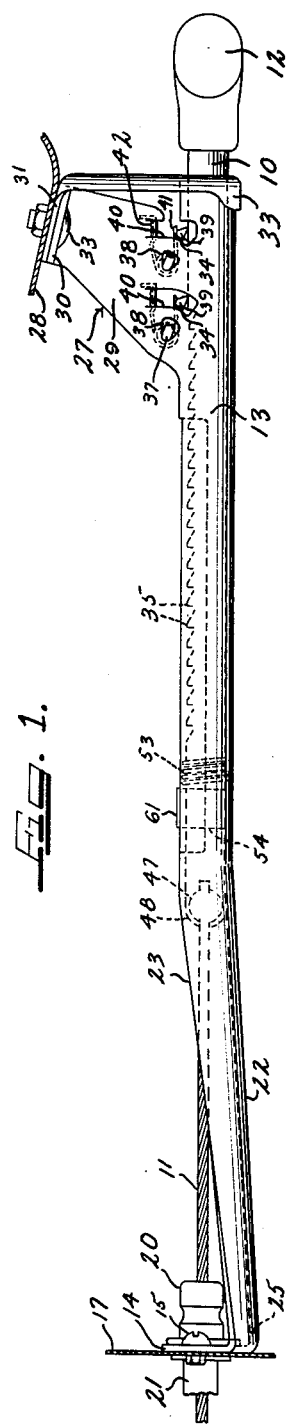
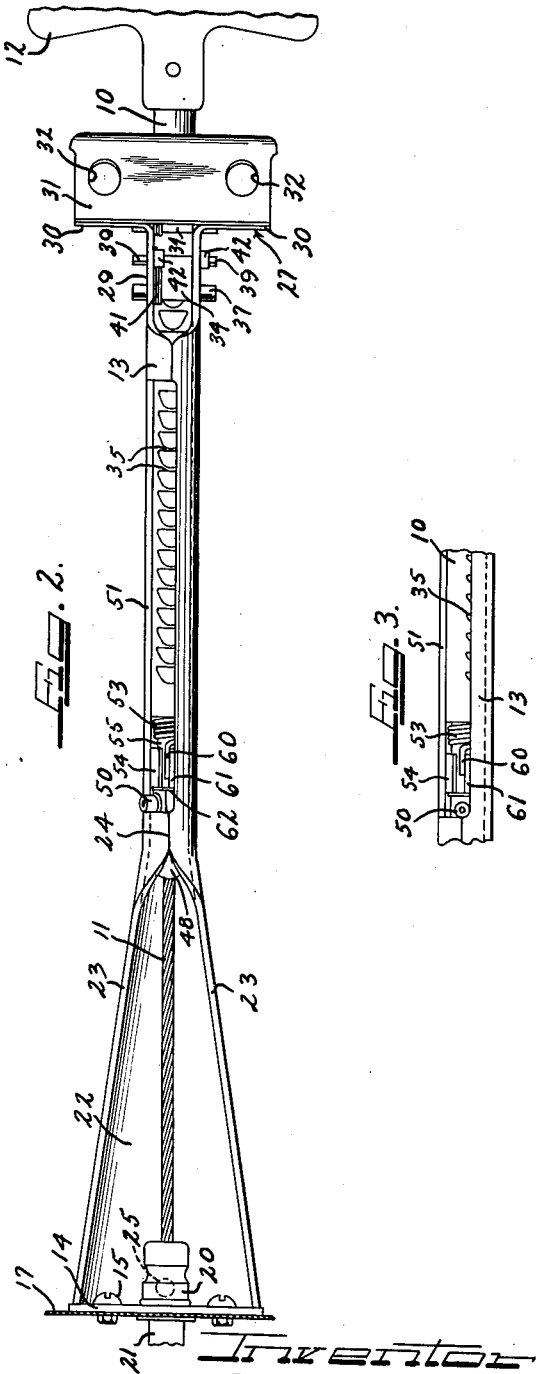
Inventor
Ray A. Sandberg.

Sept. 2, 1952     R. A. SANDBERG     2,608,881
STRAIGHT PULL BRAKE LEVER ASSEMBLY
Filed Dec. 30, 1947     2 SHEETS—SHEET 2
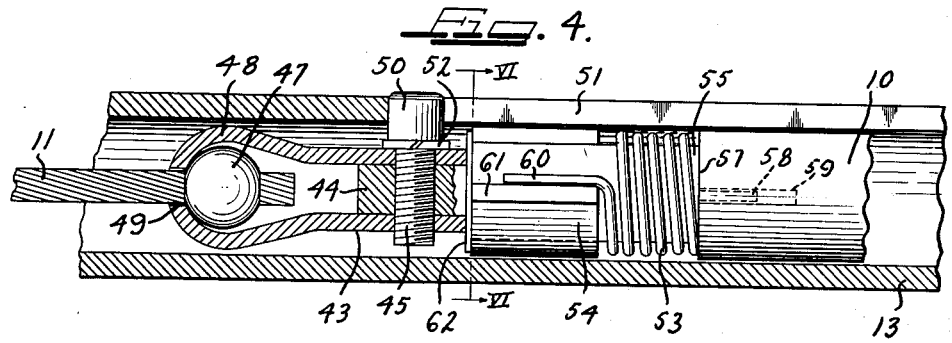
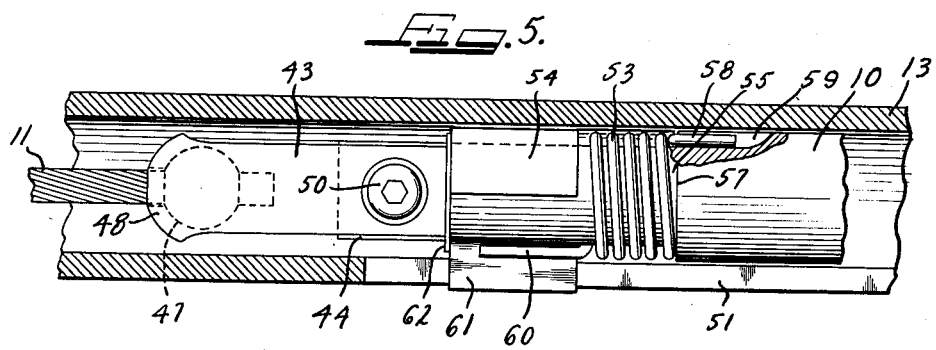
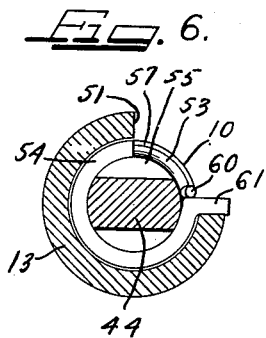 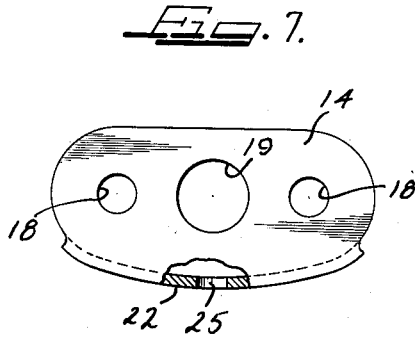
Inventor
RAY A. SANDBERG Patented Sept. 2, 1952

2,608,881

UNITED STATES PATENT OFFICE 2,608,881

STRAIGHT PULL BRAKE LEVER ASSEMBLY

Ray A. Sandberg, Waukegan, Ill., assignor to Houdaille-Hershey Corporation, Detroit, Mich., a corporation of Michigan Application December 30, 1947, Serial No. 794,647

8 Claims. (Cl. 74—503)

The present invention relates to improvements in brake lever assemblies and more particularly to straight pull brake lever assemblies which are especially adaptable for use in connection with the emergency brakes of automobiles and the like.

An important object of the present invention is to provide an improved straight pull brake lever assembly including novel torsional return means for the pull rod.

Another object of the invention is to provide in a straight pull brake lever assembly novel torsional rotary return means for the pull rod incorporated at an intermediate point of the pull rod and operative at a substantial distance from the forward end of the guiding structure for the pull rod.

A further object of the invention is to provide an improved structure in a straight pull brake lever assembly for connecting a brake operating cable to the pull rod.

Still another object of the invention is to provide in a straight pull brake lever assembly a novel pull rod guiding tube structure which is substantially longer than the pull rod and extends forwardly therefrom for attachment to the vehicle with which associated.

Other objects, features and advantages of the present invention will be readily apparent from the following detailed description of a preferred embodiment thereof taken in conjunction with the accompanying two sheets of drawings in which:

Figure 1 is a side elevational view of a brake lever assembly according to the prevent invention;

Figure 2 is a top plan view of the assembly shown in Figure 1;

Figure 3 is a fragmentary top plan view of the forward end of the pull rod and the associated guide tube showing the same in a different operative relationship than in Figure 2;

Figure 4 is an enlarged longitudinal sectional view of the forward end portion of the pull rod and associated mechanism;

Figure 5 is a sectional plan view of the structure shown in Figure 4;

Figure 6 is a transverse sectional view taken substantially on the line VI—VI of Figure 4; and Figure 7 is an end elevational view of the guide rod tube front end attachment flange.

As shown on the drawings:

The straight pull brake lever assembly forming the subject matter of the present invention comprises a pull rod 10 to which is adapted to be directly connected the end portion of a brake setting cable 11. At its opposite end the rod 10 carries a handle 12, by which it is adapted to be conveniently manipulated. The rod is cylindrical and is guided for reciprocal and rotary movement by a supporting and guide tube member 13.

According to the present invention, the guide and supporting tube 13 is of a length to extend between fixed portions of a vehicle such as an automobile with which the assembly is associated so as to guide the pull rod 10 in a fixed reciprocal path. To this end, the forward end of the guide tube 13 is preferably formed with an attachment flange 14 adapted to be secured in any preferred manner as by means of bolts 15 to a forward portion of a vehicle identified at 17 and comprising, for example, the fire wall of an automobile.

For stability, the flange 14 may be of horizontally elongated form (Figs. 2 and 7) having bolt holes 18 and a central enlarged aperture 19 within which is secured a cable 20 from which leads a cable guide tube 21 (Figs. 1 and 2).

The flange 14 is formed integral with a flared forward end portion 22 on the guide tube 13. The flared portion 22 is of generally flattened arcuate shape tapering toward the tube diameter where side flanges 23 of the flared portion meet on the diameter of the tube at a juncture 24 which may be welded to form a solid joint. In order to have the cable passage aperture 19 coaxial with the main portion of the tube 13, the flared portion 22 may be disposed slightly angularly to the remainder of the tube substantially as shown in Fig. 1. In order to afford drainage of any moisture that may collect in the receptacle provided by the flared portion 22, the same may be provided with a drainage aperture 25 at the lowest point thereof adjacent to the flange 14.

At its rear end, the guide tube 13 is preferably provided with a structure 27 by which it is adapted to be attached to a fixed structure of the vehicle with which the assembly is associated, such as a portion of a dash panel 28. To this end, the structure 27 comprises integral parallel upstanding flanges 29 having laterally extending coplanar flanges 30 to which is secured a connecting and reinforcing plate 31. The flanges 30 and the plate 31 have appropriate apertures 32 therethrough for accommodating attachment bolts 33 by which the structure 27 is attached to the dash panel portion 28. A portion of the plate 31 extends down from the rear edge thereof and engages the rear end of the tube 13 rearwardly of the upstanding flanges 29 to afford a finished appearance for the rear end portion of the assembly forwardly of the handle 12 and also to further rigidify the assembly, the lower portion of the plate being engaged as indicated at 33 with the rear end of the tube 13.

The structure 27 serves also as a pawl housing for controlling longitudinal or reciprocal disposition of the pull rod 10. To this end a pair of pawl members 34 is supported by the flanges 29 for selective engagement with ratchet teeth 35 on the pull rod 10 and engageable with the pawls 34 when the rod 10 is pulled rearwardly, whereby to hold the pull rod 10 in brake setting position. The pawls 35 are formed with oppositely extending respective arms 37 which are pivotal in openings 38 in the flanges 29 above the pull rod 10 and also with respective laterally oppositely extending arms 39 which extend through and are swingable within arcuate slots 40 in the flanges 29, the pawls being held in ratcheting position by torsion springs 41 spiraled about the selected arms 37 of the pawls and having one leg engaging the adjacent arm 39 of the pawl and the other leg engaging a fixed, integrally struck out biasing lug 42 upon a selected one of the flanges 29. As a result, when the rod 10 is pulled forwardly by means of the handle 12, the pawls 34 engage successive ratchet teeth 35 for incremental brake setting adjustment of the pull rod. For a more detailed description of the pawl and ratchet structure and operation and the pawl housing provided by the guide tube, reference may be had to my copending application Serial No. 779,183, filed October 10, 1947.

According to the present invention attachment of the cable 11 to the forward end of the pull rod 10 is effected by means of a strap clevis 43 (Figs. 4 and 5) which has the opposite legs thereof in engagement with a flatted forward terminal 44 on the pull rod 10 and to which the clevis legs are secured by means such as a screw 45. The cable 11 is attached to the clevis as by means of a generally spherical terminal lug or knob 47 secured to the cable terminus and freely slidably received within a bulbous enlargement 48 at the bight of the clevis which freely clears the lug 47 so as to permit free relative movement. An aperture 49 is provided for passage of the cable 11 through the bight of the clevis but the aperture is substantially smaller than the retaining lug 47.

Forward movement of the pull rod 10 under the influence of the brake tension as transmitted through the cable 11, is limited by the screw 45 which for this purpose is provided with a relatively large head 50 projecting through a longitudinal slot 51 in the guide tube 13. The bolt head 50 engages the forward end of the slot 51 in the forward limit of the pull rod movement. By preference a lock washer 52 is interposed between the bolt head 50 and the adjacent leg of the clevis 43.

For releasing the pull rod 10 from any brake setting position thereof, it is adapted to be turned a partial revolution to clear the ratchet teeth 35 from the pawls 34, whereupon the pawls are engaged upon a peripheral portion of the pull rod adjacent to the teeth and the rod can then slide past the pawls forwardly in releasing the brake. To permit this turning movement of the rod, the slot 51 is of sufficient width to afford an adequate range of lateral angular movement of the stop head 50. Thus, the width of the slot is determinative of the angular movements of the pull rod 10, the stop head 50 engaging one longitudinal edge of the slot in the ratcheting angular position of the pull rod 10 and being engageable with the opposite longitudinal edge of the slot in the released angular position of the pull rod. In Figure 2, relationship of the parts appears in the ratcheting position of the pull rod, while in Figure 3 is shown the relationship of parts in the release position of the pull rod.

Means are provided for positively returning the pull rod 10 angularly to its ratcheting position automatically as an incident to release of turning force through the medium of the handle 12. Herein such means comprise a torsion spring 53 and a torque sleeve 54 disposed rearwardly of the limit stop head 50 at the forward end portion of the rod 10. For this purpose, the forward end portion of the pull rod 10 rearwardly of the flatted terminus 44 is formed with a reduced diameter cylindrical portion 55 which is of predetermined length to accommodate the torsion spring 53 and the torque sleeve 54 between a shoulder 57 at the rear end of the reduced diameter portion 55 and the forward end of the reduced diameter portion. Thereby, the torsion spring 53 in the form of a helical coil of slightly less external diameter than the diameter of the pull rod 10 has a rearwardly extending terminal 58 received in a longitudinally extending slot 59 in the pull rod intersecting the shoulder 57 whereby to anchor the terminal for rotary movement with the pull rod while the rear end of the torsion spring bears against the shoulder 57. At its forward end the torsion spring 53 has a forwardly extending terminal 60 which is received between the terminals of a split in the torque sleeve 54 and in assembly is placed under slight permanent torsional load to bear against a terminal flange 61 extending radially from the torque sleeve and projecting through the slot 51 to engage against one longitudinal edge of the slot, namely that edge toward which it is driven by the torque load of the spring 53 while the pull rod 10 is driven in the opposite angular direction to the limit permitted by engagement of the stop pin head 50 against the opposite edge defining the slot. The torque sleeve 54 is slidably disposed about the reduced diameter portion 55 of the pull rod and is of approximately the same external diameter as the external diameter of the pull rod so that the torque sleeve as well as the torsion spring 53 is freely received within the tube 13 clear of the bore thereof. Endwise forward displacement of the torque sleeve 54 is prevented by a retaining washer 62 held in place by the ends of the legs of the clevis 43, the washer being preferably of angular eye to be received over the flatted terminal 44 of the pull rod.

From the foregoing it will be apparent that the pull rod 10 is held at all times by action of the spring 53 in the angular position wherein the ratchet teeth 35 are engageable with the pawls 34 upon rearward longitudinal movement of the pull rod 10. When the pull rod 10 is willfully turned in opposition to the torsional loading of the spring 53, the spring is further loaded by reason of its terminal engagement with the rod 10 at one end and the torque sleeve 54 at the other, the torque sleeve being held against angular displacement in the direction of the turn by engagement of the limit flange 61 thereof against the opposing edge of the slot 51, whereby the spring 53 is placed under increased torque for positively returning the pull rod 10 to ratcheting position virtually instantaneously upon release of the brake releasing torque on the pull rod. By virtue of the slot 51, the torque sleeve 54 is freely movable longitudinally with the pull rod 10 in the reciprocation of the pull rod during brake setting or brake releasing action of the pull rod. The rear edge of the limit flange 61 may also serve as a positive stop by engagement with the rear end of the slot 51 to prevent over drawing of the brake cable 11 should the brakes ever become loose to the extent which might permit such over pulling.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a straight pull brake lever assembly, a pull rod, a guide tube for the pull rod which is longer than the pull rod and has a longitudinal slot therein, means at the opposite end portions of the guide tube for attaching the tube rigidly to spaced portions of a vehicle so that the pull rod can be moved longitudinally within the tube, means for attaching a brake cable to one end of the pull rod, the opposite end of the pull rod having a handle projecting beyond the adjacent end of the tube, a longitudinal series of ratchet teeth on the rod, pawl means carried by the tube and engageable with the ratchet teeth for holding the pull rod in incremental brake setting longitudinal positions within the tube, the pull rod being rotatable to clear the ratchet teeth from the pawl means, and means for positively returning the pull rod to ratcheting rotary position after having been turned to pawl clearing position and including a member projecting laterally from the pull rod and engageable with an edge defining said slot, said member being movable longitudinally within said slot during longitudinal movements of the rod and having rotary connection with the rod so that the rod can be moved rotatably within the tube while said member maintains engagement with said edge.

2. In combination in a straight pull brake lever assembly, a reciprocable and rotatable pull rod, a guide tube for the pull rod which is of a length substantially to enclose the pull rod and has a longitudinal opening therein, means for attaching the guide tube in a vehicle in position to enable attachment of a brake cable to one end portion of the pull rod, the opposite end of the pull rod having a handle projecting beyond the adjacent end of the tube, a longitudinal series of ratchet teeth on the rod, pawl means carried by the tube and engageable with the ratchet teeth for holding the pull rod in incremental brake setting longitudinal positions wtihin the tube, the pull rod being rotatable to clear the ratchet teeth from the pawl means, and means for positively returning the pull rod to ratcheting rotary position after having been turned to pawl clearing position and including an element projecting laterally from the pull rod and engageable with an edge defining said opening, said return means including a torsion spring having an end anchored on the rod and a torque sleeve having said laterally projecting element thereon and providing an abutment for an opposite end portion of the spring maintained under torsion load by the abutment and anchorage at its ends.

3. In combination in a straight pull brake lever assembly, a pull rod, a guide sleeve for the pull rod within which the pull rod is slidable for longitudinal and rotary movements, the sleeve being of greater length than the pull rod and projecting beyond the forward end of the pull rod, the sleeve having a longitudinal slot therein, a reduced diameter portion on the pull rod, a coiled torsion spring engaged about said reduced diameter portion, said spring having a terminal extending in one direction and engaging fixedly with the pull rod, another terminal projecting in the opposite direction from the coil spring, and a torque sleeve slidably engaging said reduced diameter portion and having a portion thereof projecting laterally through said slot to delimit angular displacement of the torque sleeve relative to the guide tube, said torque sleeve being engaged by said oppositely extending terminal on the spring, whereby rotation of the rod is independent of the torque sleeve and the torsion spring is placed under torsional load for returning the rod to initial rotary position upon release of turning force upon the rod, said spring and said torque sleeve being of no greater external diameter than the internal diameter of the guide sleeve so as to be freely movable with the rod longitudinally within the guide sleeve.

4. In combination in a straight pull brake lever assembly, a pull rod, a guide tube within which the pull rod is reciprocably and rotatably mounted, the guide tube having a longitudinal slot, the pull rod having ratchet teeth thereon, brake setting adjustment pawl means engageable with said ratchet teeth, the pull rod being rotatable to clear the pawl means for releasing the brake, a reduced diameter portion on said pull rod having a shoulder at one end, a longitudinal slot in the pull rod intersecting said shoulder, a coil torsion spring encircling said reduced diameter portion and having a terminal within said pull rod slot to hold the end of the spring abutting said shoulder against relative turning movement, the spring having a terminal at its opposite end extending in the opposite direction from the rod slot-engaged terminal, and means longitudinally movable with the rod but relatively rotatably disposed on said reduced diameter portion and engaging said oppositely extending terminal portion of the spring, said means having a portion engageable within said tube slot to hold said means against rotation with the pull rod so as to develop a rod returning torsional load in the spring when the rod is turned into pawl releasing position, said means and said spring being longitudinally movable with the rod within said guide tube.

5. In combination in a straight pull brake lever assembly, a supporting and guiding tube, a pull rod slidably mounted in said tube, said rod having ratchet teeth thereon, said tube having pawl means thereon engageable with said ratchet teeth and disengageable from the rod by turning the rod to clear the ratchet teeth from the pawl means so that the pawl means slide on the perimeter of the rod, said tube being of a length to extend substantially beyond the forward end of the rod and being adapted to be located in position in a vehicle so that a brake cable can be attached to the forward end of the rod, means on said forward end of the tube for attaching the same rigidly to a vehicle so that the rod can be moved longitudinally and rotatably relative to the tube, and means cooperatively interengaging with the forward end portion of the rod and with the tube and biasing the rod angularly to return to ratcheting position when pawl clearing torque is released from the rod.

6. In combination in a straight pull brake lever assembly of the character described, a pull rod, a guide tube for the pull rod, means at the forward end of the pull rod for attaching a brake setting cable to the pull rod and including a screw having a stop pin head projecting laterally beyond the diameter of the pull rod, a longitudinal slot in said tube into which the stop pin head projects, the pull rod having ratchet teeth thereon, and pawl means carried by the tube engageable with the ratchet teeth, the pull rod being rotatable to clear the ratchet teeth from the pawl means, said slot being of a width determinative of the extent of the range of rotary movement of the pull rod as determined by engagement of the opposite edges of the slot by said screw head stop pin.

7. In combination in a straight pull brake lever assembly, a pull rod, a supporting and guiding tube for the pull rod, a clevis secured to the forward end of the pull rod for attachment of a brake setting cable terminal to the pull rod, the pull rod having a longitudinal series of ratchet teeth, the tube having brake setting pawl structure thereon engageable with the ratchet teeth, said ratchet teeth being adapted to be cleared from the pawl structure by turning of the pull rod, the pull rod having a reduced diameter portion adjacent to its forward terminal, a torsion spring and a torque sleeve carried by the reduced diameter portion and held in place thereon by a retaining washer held in position by said clevis, the torsion spring being connected at one end to the pull rod and at the other end to the torque sleeve, the tube having a longitudinal slot and the torque sleeve having a laterally extending follower flange within said slot to hold the sleeve against rotary movement with the rod when the rod is turned to pawl clearing position, said spring acting to return the rod positively to ratcheting position.

8. In combination in a straight pull brake lever assembly, a pull rod, a guide tube structure including a tubular portion of substantially the same length as the rod and within which the rod is slidably reciprocable and rotatable and having means releasably cooperative with the rod to hold the rod in incremental brake setting positions in the tubular portion, said tube structure having a forward generally transversely dished laterally open flaring portion projecting beyond the forward end of said tubular portion and the rod to a substantial extent so that the guide tube structure has an elongated extension enabling rigid attachment of the guide tube structure between parts of a vehicle spaced apart substantially farther than the length of the rod, said flaring portion gradually widening from the diameter of the tubular portion to a substantially greater width than said tubular portion at the forward end of the flaring portion and projecting substantially laterally to opposite sides of the tubular portion, said flaring portion having a terminal flange at its forward greater width end integral therewith on a rigidifying juncture following the dished form of the flaring portion, said flange extending toward the open side of the flaring portion and angular to and across the axis of the guide tube structure and the pull rod and adapted to be secured to a fixed portion of a vehicle with which the brake lever assembly is to be used, said flange having a central cable passage opening therein coaxial with the pull rod and substantial areas laterally from said central opening but integral with said rigidifying juncture for receiving attachment means, and means on the rear end portion of the tubular portion of the guide tube structure for attachment to a part of the vehicle spaced substantially rearwardly from said fixed part of a vehicle.

RAY A. SANDBERG.

REFERENCES CITED

The following references are of record in the file of this patent:

UNITED STATES PATENTS

| Number | Name | Date |
|---|---|---|
| 1,225,100 | Aubrey | May 8, 1917 |
| 1,619,117 | Gray | Mar. 1, 1927 |
| 1,713,842 | Link | May 21, 1929 |
| 2,126,234 | Weber | Aug. 9, 1938 |
| 2,136,095 | Baumbeckel | Nov. 8, 1938 |
| 2,205,983 | McCarthy | June 25, 1940 |
| 2,256,696 | Weber | Sept. 23, 1941 |
| 2,377,691 | Jandus | June 5, 1945 |
| 2,429,224 | Fergueson | Oct. 21, 1947 |
| 2,438,548 | Ehmann | Mar. 30, 1948 |